United States Patent [19]

Wissel et al.

[11] 4,290,143
[45] Sep. 15, 1981

[54] TRANSMISSION METHOD AND APPARATUS WHEREIN BINARY DATA BITS ARE CONVERTED INTO BARKER WORDS AND VICE VERSA

[75] Inventors: F. A. Wissel; D. A. Kiliman, both of Cincinnati, Ohio

[73] Assignee: Cincinnati Electronics Corporation, Cincinnati, Ohio

[21] Appl. No.: 31,457

[22] Filed: Apr. 19, 1979

[51] Int. Cl.³ .......................... H04L 3/00; H04B 3/60; H04B 12/02
[52] U.S. Cl. .............................. 455/38; 340/347 DD; 375/25; 375/59; 375/75
[58] Field of Search ............... 455/31, 38, 51; 370/92; 371/42, 47, 57; 340/167 R, 311, 347 DD; 375/34, 37, 59, 108, 118, 25, 75

[56] References Cited

U.S. PATENT DOCUMENTS

| | | | |
|---|---|---|---|
| 2,700,696 | 1/1955 | Barker | 179/2 DP |
| 2,973,511 | 2/1961 | McLaughlin | 340/347 DD |
| 3,349,177 | 10/1967 | Caitermoze | 375/25 |
| 3,569,956 | 3/1971 | Paine | 340/347 DD |
| 3,594,560 | 7/1971 | Stanley | 340/347 DD |
| 3,599,205 | 8/1971 | Van Duuren et al. | 340/347 DD |
| 3,603,976 | 9/1971 | Paine | 340/347 DD |
| 3,778,605 | 12/1973 | Montgomery | 340/347 DD |
| 3,810,155 | 5/1974 | Widl et al. | 340/347 DD |
| 3,909,781 | 9/1975 | Krol et al. | 340/347 DD |
| 3,921,210 | 11/1975 | Halpern | 340/347 DD |
| 3,953,673 | 4/1976 | Dorward | 340/347 DD |
| 3,995,264 | 11/1976 | Ouchi | 340/347 DD |
| 4,030,093 | 6/1977 | Denes et al. | 340/347 DD |

OTHER PUBLICATIONS

Radar Handbook-M. I. Skolnik, 1970, McGraw-Hill, Inc. pp. 3-30, 20-18, 33-25.

Primary Examiner—Marc E. Bookbinder
Attorney, Agent, or Firm—Lowe, King, Price & Becker

[57] ABSTRACT

A binary encoded data transmission system wherein a binary data bit of a first value is represented by a first predetermined multi-bit binary Barker word and a binary data bit of a second value is represented by a second multi-bit binary Barker word, the bits in like positions in said first and second words having complementary binary values. A transmitter transmits preselected encoded data words in the aforementioned format and a receiver receives such words for decoding data. A selective call system is provided utilizing Barker/Barker complement encoded words as assigned addresses.

26 Claims, 6 Drawing Figures

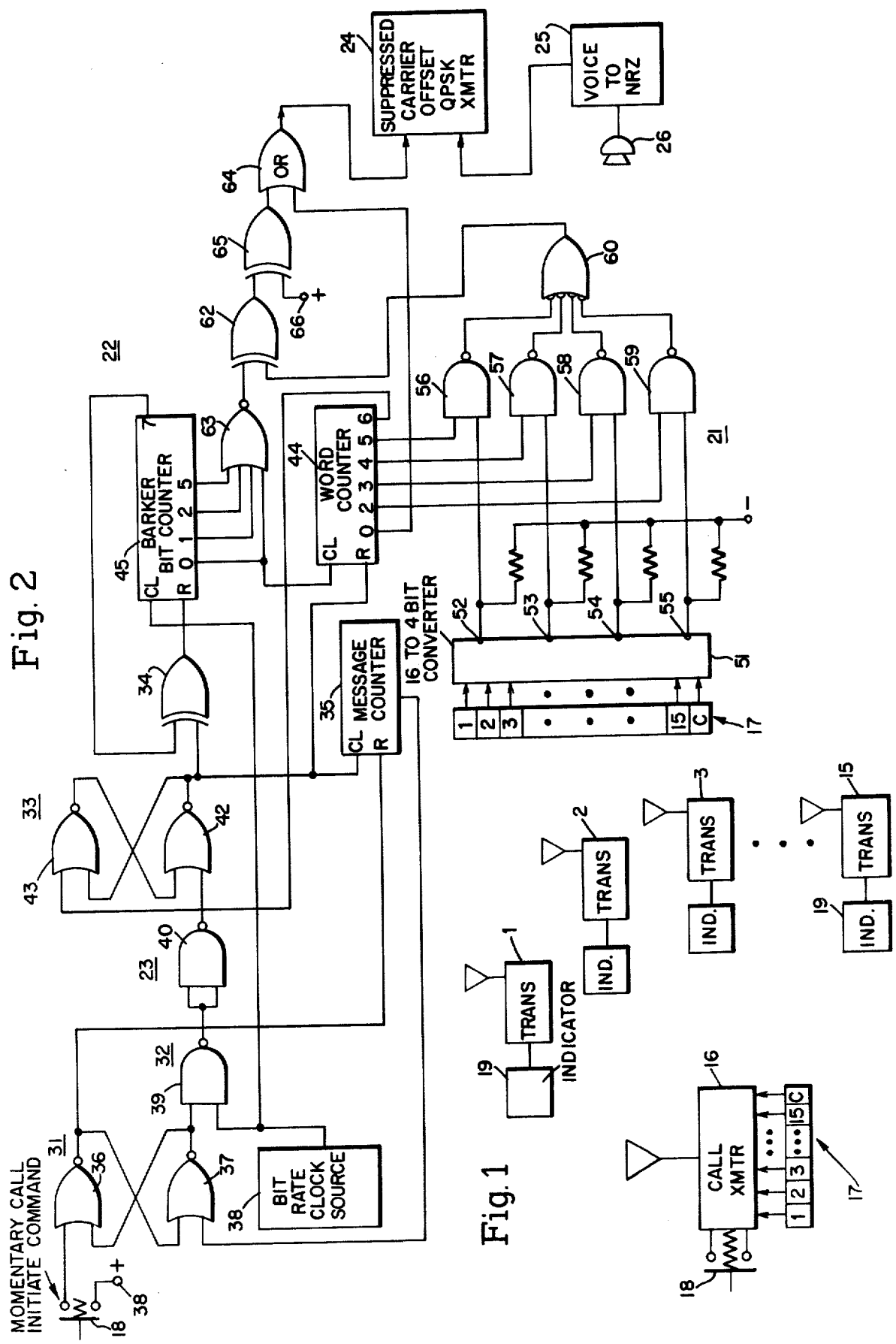

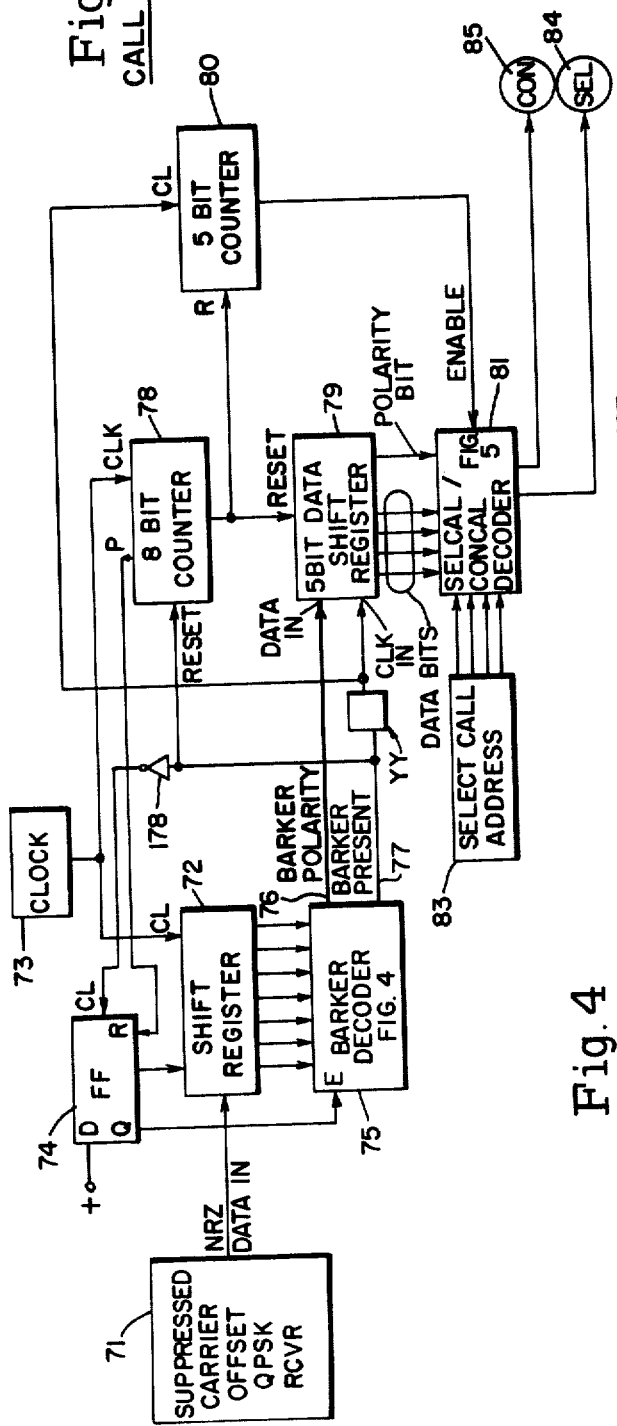
Fig.3 CALL DECODER
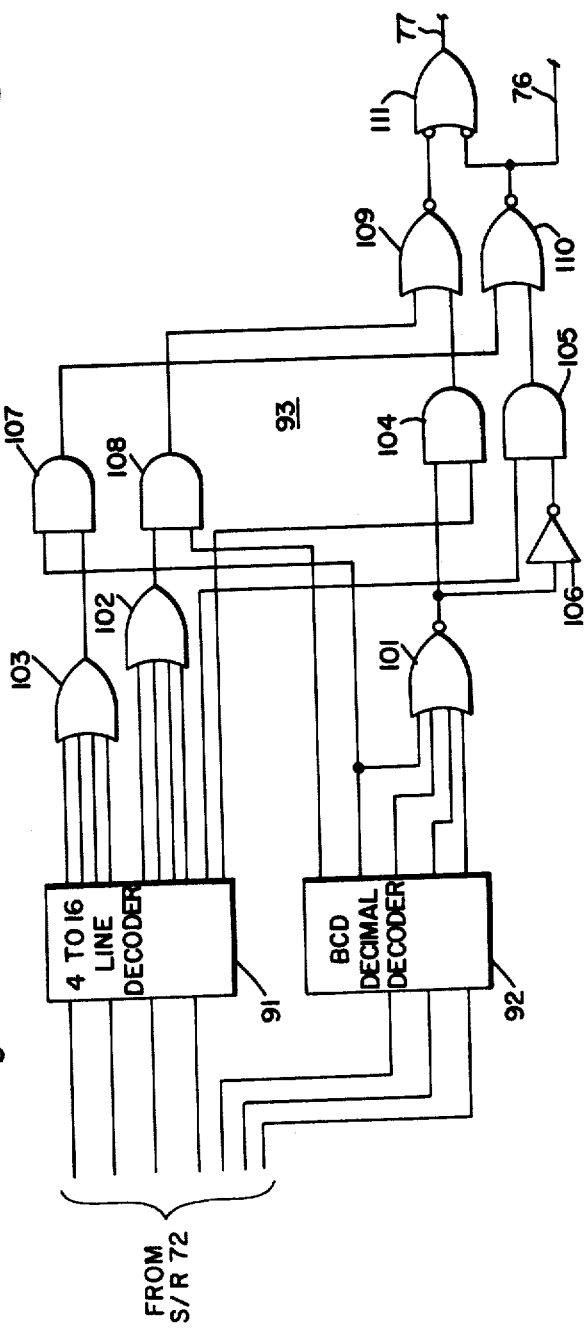
Fig.4

TRANSMISSION METHOD AND APPARATUS WHEREIN BINARY DATA BITS ARE CONVERTED INTO BARKER WORDS AND VICE VERSA

FIELD OF THE INVENTION

The present invention relates to a method of and apparatus for transmitting multi-bit binary data signals and more particularly to a transmitting method and apparatus wherein each binary data bit is represented as a multi-bit binary Barker word.

BACKGROUND OF THE INVENTION

For certain applications, such as manpack transceivers that communicate with each other through a very low power, high noise transmission link, such as a link through a geo-stationary, synchronous satellite, it is necessary to provide a relatively simple, practical and reliable system for transmitting digital signalling messages. In such a transmission link, a message structure between the transceivers must be capable of reliable recognition of a true message, of low misinterpretation probability (incorrect message) and very low false recognition probability of random or unrelated messages or noise. While many structures have been designed to meet such requirement, few of the prior art structures lend themselves to simple, practical, low power and low cost decoding. It is very desirable for the message structure to provide automatic word synchronization, as well as high immunity to word timing errors with simple circuitry. It is also necessary for the link and system to enable binary data to be recognized correctly, even though a significant percentage of the message bits are erroneously received due to link perturbations or high ambient noise.

A particular application where such data transmission is necessary involves selectively calling one of several transceivers from a single transmitter or simultaneous calling of several transceivers from a single transmitter. Each called transceiver is assigned a number, which can be represented as a series of binary bits. We are aware of no prior art structures or communication links which are capable of meeting all of the requirements required to address one of several stations with the stated performance criteria.

BRIEF DESCRIPTION OF THE INVENTION

In accordance with one aspect of the invention, a method of and apparatus for transmitting coded binary data signals comprises responding to binary data bits having first and second values to derive first and second multi-bit binary Barker words having first and second predetermined combinations of binary bits. The first and second combinations include the same number of bits, with the bits in like positions in the two combinations having complementary binary values. The Barker words and bits are sequentially transmitted. At a transceiver responsive to the transmitted multi-bit Barker words, the Barker words are converted back into binary data bits having values that are replicas of the original binary data information.

As disclosed by Barker in the book *Communication Theory*, pages 273–275, published by Butterworth Scientific Publications, London, 1953 and discussed by Bennett et al in *Data Transmission*, published by McGraw-Hill Book Company, 1965, page 265, a Barker word is a special type of binary sequence used to provide framing indications for synchronization purposes. A Barker word is a set or sequence of binary bits having an autocorrelation coefficient as small as possible except when it is perfectly matched or in phase with itself. When bits of a Barker word are received without error and are in phase or matched to a local Barker word, the autocorrelation coefficient has a maximum value. If a series of Barker words is received without binary errors but is not in phase or not matched to the local reference sequence, so they are shifted from the local sequence by one or more word bits, the autocorrelation coefficient has the same small value for all phase shifts. For example, for a seven bit Barker word having the sequence 1110010, the autocorrelation function between a matched (in phase) received and local sequence is 7. If there is a one bit phase shift between a received sequence of two or more identical Barker words and a single local 7 bit reference, the autocorrelation function is $-1$; the autocorrelation is also $-1$ for each of the other five possible phase positions between a received sequence having no bits in error and a local word.

If the bits of a transmitted Barker word are reversed in transmission so the complement of the receiver, i.e. local, Barker word is received, the correlation function between the received and local Barker words is algebraic minimum. If there is a one bit phase shift between the complementary received and local Barker words, the correlation coefficient has a value markedly different from the correlation coefficient for the two complementary Barker words. For example, if the local Barker word is 1110010, and the complement thereof, 0001101, is received, the correlation function is $-7$. If, however, there is a phase shift of one or more bits between the received and local complementary Barker words, the correlation function is $+1$ for each of the six phase shift positions.

Furthermore and important to this invention, the correlation coefficient between a sequence of alternating Barker and Barker complement words and a local 7 bit Barker reference also exhibits the same desirable properties. The correlation coefficient oscillates between $+1$ and $-7$ for the in-phase conditions and between $+$ and $-1$ for all possible out of phase conditions. Such oscillation makes it possible to code a serial binary data stream using Barker and Barker complement patterns respectively representing data binary one and zero data bits.

In coding terms it can be recognized that there is a distance of at least 6 units (7 minus 1) between a received in-phase and out of phase sequence and 14 units [7 minus $(-7)$] between a Barker and Barker complement. A single in-phase error always reduces the correlation in-phase absolute magnitude by 2 units to 5, and a single out-of-phase error may increase the absolute value by 2 units to 3. Thus there is a difference in magnitude between in-phase and out-of-phase correlation allowing positive detection of Barker word presence and phase in the presence of one error in a 7 bit Barker sequence. These two characteristics permit the construction of a receiver/decoder employing a relatively simple decoder which continuously examines the most recent 7 bit segments of binary bits for a Barker (Barker complement) pattern, assigns a binary data one or zero value to the output and recognizes a known pattern of data bits under conditions of high bit error rates. (To clarify any possible misunderstanding, the binary value of a Barker/Barker complement word is always referred to as a "binary data value", generally as a data bit. In contrast the term "binary bit" always refers to one of the seven bits comprising a seven bit word.)

In the disclosed embodiment, a seven-bit Barker word length is chosen as the shortest length allowing reliable detection of messages in a very high bit-error rate environment (about 10%). The next shorter word length (5-bits) does not provide the desired error correction feature. The longer Barker words require a significant increase in decoder complexity to achieve only moderately improved results; the improvement is not required in practical operating situations. However, the invention is also applicable to Barker words having other than seven bits.

When the method is performed in connection with apparatus for selectively calling one of a plurality of different stations, each of which is identified by a different numerical value, the numerical value of the called station is converted into a multi-bit data representing binary value. The two possible values for each binary data bit are converted into first and second serial multi-bit binary Barker words that are the complement of each other. Only the called station normally recognizes the transmitted Barker word sequence as that associated with its particular numerical value. The called station automatically responds to the sequence of Barker/Barker complement words associated with it to energize an indicator or automatically switch the transceiver into a receive mode.

If a received Barker word differs by one bit from a transmitted Barker word, the received word is recognized as a true Barker word, i.e., as having the binary data value associated with the transmitted Barker word. If, however, the received Barker word differs from a transmitted Barker word by more than one bit, the recognition process for determining the numerical value of the called station is reset. This ability to reset in response to a received seven bit sequence differing from a Barker word by more than one bit is advantageous because it enables resetting after a false message which matches the initial portion of a true message, and because it enables resetting in response to a seven bit framing word that differs from a Barker word by two or more bits. In response to a resetting the receiver can immediately begin a new decoding sequence to determine the value of received address bits.

In accordance with another feature of the invention, a predetermined received Barker word sequence can represent either a binary one or a binary zero. The binary value of a received Barker word is indicated by a reference Barker word transmitted immediately after a framing word. Such a scheme avoids a differential coding loss in the bit detector and is particularly advantageous in a suppressed carrier, quadrature phase shift key transmission system employing a rotating, rather than fixed, reference. Such a transmission system is disclosed in the co-pending, commonly assigned application of Wissel and Kiliman, entitled "QPSK SUPPRESSED CARRIER WITH ROTATING REFERENCE PHASE", filed Apr. 17, 1979 bearing Ser. No. 030,905.

A further feature of the invention is that one of the stations can be selectively called, or all of the stations can be called in response to a single set of data indicating Barker words. To call all of the stations simultaneously (conference call), a sequence of Barker words different from the called station identification sequences is employed. For example, in a fifteen station system if a conference call is instigated, the sequence of Barker words represents 1111, while the called stations have identifying numbers in the range of 0000–1110.

It is, accordingly, an object of the present invention to provide a new and improved system for and method of transmitting binary coded data.

Another object of the invention is to provide a new and improved system for and method of selectively addressing one of several remote stations.

Another object of the invention is to provide a new and improved system for and method of calling one of several or all of a plurality of remote stations.

An additional object of the invention is to provide a new and improved system for and method of selectively calling one of a plurality of stations under very poor channel conditions by utilizing a reliable, simple and practical decoding technique.

A further object of the present invention is to provide a new and improved digital data transmission system and method which is susceptible for use under very poor channel conditions, and is highly reliable, relatively simple and quite practical.

A further object of the present invention is to provide a new and improved low power, lost cost system for and method of transmitting binary data between remote stations.

Still another object of the invention is to provide a new and improved system for and method of transmitting binary coded data wherein word synchronization is automatically provided, as is high immunity to word timing errors and error correction is automatically provided with relatively simple circuitry.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 1 is an overall system block diagram;

FIG. 2 is a block diagram of apparatus included at a transmitter in accordance with the invention;

FIG. 3 is a block diagram of a receiver in accordance with a preferred embodiment of the invention;

FIG. 4 is a circuit diagram of the Barker decoder included in the receiver of FIG. 3;

DETAILED DESCRIPTION OF THE DRAWINGS

Figure 5:
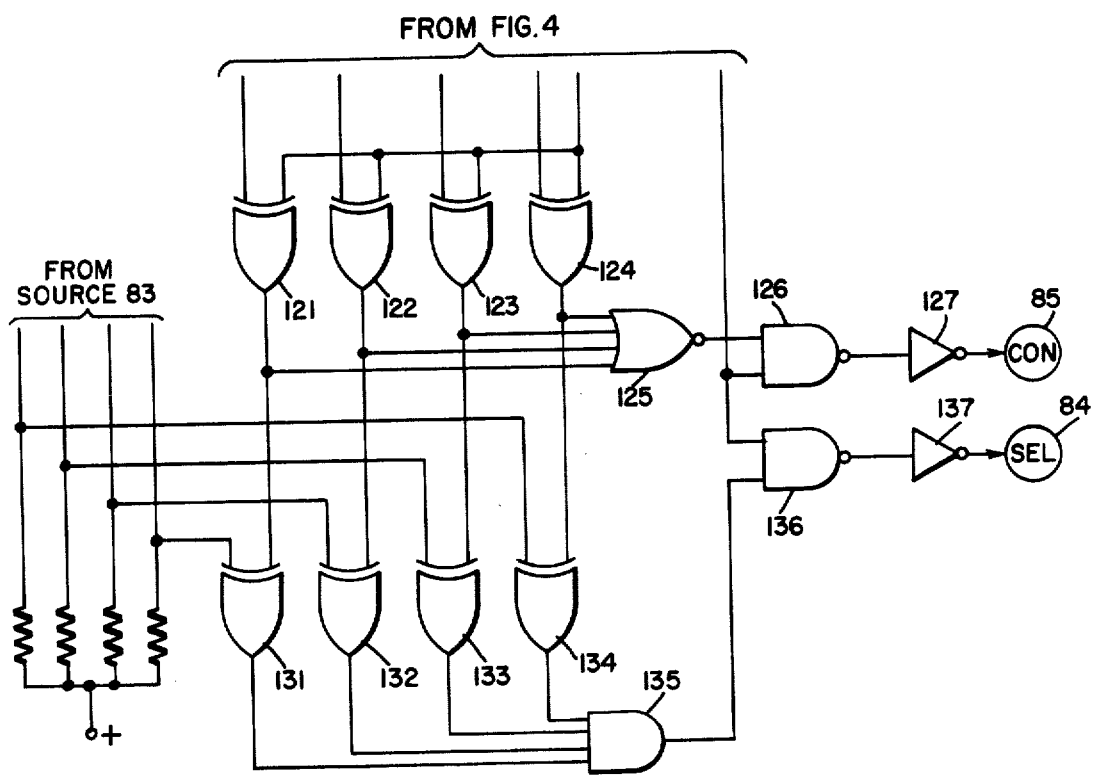
FIG. 5 is a circuit diagram of the decoder in the receiver of FIG. 3.

Reference is now made to FIG. 1 of the drawings wherein any one of the transceiver stations 1, 2, 3 . . . 5 is selectively called by transmitter 16 in response to an operator at the transmitter activating one of the pushbuttons in keyboard 17, after which the operator closes spring biased switch 18 momentarily. Keyboard 17 includes 15 buttons, one for each of transceivers 1, 2, 3 . . . 15, as well as an additional button C for a "conference" call which enables all of the transceivers to be simultaneously called.

Figure 6:
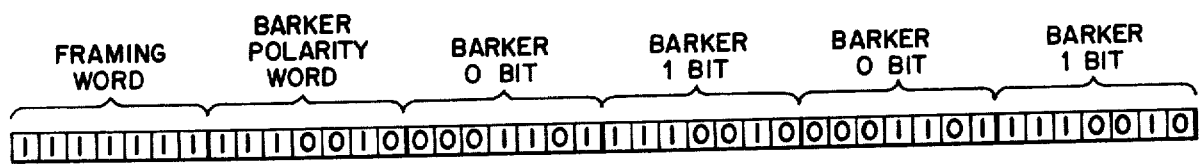
FIG. 6 is a format diagram of a transmitted address frame that enables one or all of the receivers in the system illustrated in FIG. 1 to be enabled.

In response to one of the buttons 1, 2, 3 . . . 15 in keyboard 17 being activated, a sequence of signals is transmitted as an offset suppressed carrier quadrature shift key signal, preferably having a rotating reference phase, to each of transceivers 1, 2, 3 . . . 15. The sequence of signals indicates the address of the called transceiver, each of which has a unique address assigned to it. Because fifteen transceivers are in the system illustrated, a four bit binary data word is derived from transmitter 15 in response to activation of any one of the buttons associated with stations 1-15. As illustrated by the last four rectangles in FIG. 6, each data bit is formed as a sequential, seven bit Barker word, whereby binary 1 and 0 data words are respectively represented as 1110010 and 0001101 sequences. In the alternative, binary ones and zeros can be respectively represented as 0001101 and 1110010. An indication of whether a received 1110010 Barker word represents a binary 1 or 0 data bit is provided by a seven bit polarity indicating Barker word (the second rectangle in FIG. 6) transmitted prior to the four data bit representing Barker words. Before the polarity indicating seven bit Barker word is derived, the calling transmitter automatically derives a frame initializing, seven bit word, consisting of 1111111 or 0000000, as illustrated by the first rectangle in FIG. 6.

All of the transceivers 1-15 respond to the seven bit, framing word and the polarity indicating Barker words. Only the transceiver having an address coinciding with the transmitted four bit address responds to the data indicating Barker words. Each of transceivers 1-15 includes an indicator 19, such as a visual or aural transducer, which is activated when the address transmitted from transmitter 16 coincides with the address of the particular transceiver. Each of transceivers 1-15 may also include an automatic device to activate it into a receiving condition in response to its address being called by transmitter 16. Once the particular called station has been called and has been activated into an operating condition, either manually or automatically, message transmission between transmitter or base station 16 and the called station commences via the suppressed carrier offset quadrature phase shift key link between the transmitter and called receiver.

If a conference call is established in response to the operator at transmitter 16 activating button C, the four Barker data indicating words have a unique code, such as 1111. All of transceivers 1-15 respond to the unique 1111 code, whereby a suppressed carrier offset quadrature phase shift key link is simultaneously established between transmitter 16 and all of transceivers 1-15.

A circuit diagram of the apparatus included in a preferred embodiment of transmitter 16 is illustrated in FIG. 2. Transmitter 16 includes a converter 21 for translating the selected button of keyboard 17 into a serial four bit binary signal and circuits 22 for converting the binary value of the four bit binary, address representing signal into a seven bit Barker word. In addition, transmitter 16 includes control circuitry 23 for converter 21 and Barker word generator circuit 22. Binary bits derived from Barker word converting circuit 22 are fed to suppressed carrier offset quadrature phase shift key transmitter 24, also responsive to voice to non-return-to-zero converter 25 which is driven by an audio voice source, microphone 26.

Control circuit 23 includes a flip-flop 31, AND gate 32, flip-flop 33, exclusive OR gate 34, and message counter 35. Flip-flop 31 includes cross coupled NOR gates 36 and 37 having inputs respectively responsive to closure of spring biased switch 18 and the output of multistage counter 35 that determines the full length of the repeated messages. In response to switch contacts 18 being momentarily closed by the operator manually activating switch 18, flip-flop 31 is activated to the set state by virtue of the d.c. bias voltage at terminal 38 being coupled through the switch to one of the inputs of NOR gate 36. In response to a selected number of six-word messages being derived from transmitter 16, flip-flop 31 is reset in response to the output of counter 35 being coupled to one of the inputs of NOR gate 37. With flip-flop 31 in a set condition, AND gate 32 is enabled to pass square wave clock waveforms from bit rate clock source 38. To this end, AND gate 32 includes cascaded NAND gates 39 and 40; NAND gate 39 has a pair of inputs respectively responsive to the outputs of NOR gate 37 and clock source 38. It is thus seen that NAND gate 40, included in AND gate 32, derives a sequence of square wave clock waveforms during the full desired transmission interval.

Counter 44 is activated to a state corresponding with the number of the seven bit word being transmitted. When the all one framing word is being transmitted, counter 44 is in state zero; when the polarity indicating Barker word is being transmitted, counter 44 is activated to state 1; when the four binary data bit Barker words are being transmitted, counter 44 is activated to states 2, 3, 4 and 5, respectively. In response to counter 44 being in states 0-5, binary one signals are respectively derived in sequence at output terminals Q0-Q5 of counter 44. Counter 44 is reset to the zero state in response to flip-flop 33 being reset, by virtue of a connection between the output terminal of NOR gate 42 and a reset (R) input terminal of the counter. Counter 35 is advanced by a count of 1 upon the completion of each transmitted frame because of a connection to its clock (CL) input terminal from NOR gate 42 of flip-flop 33. Flip-flop 33 is reset after each message by virtue of a connection from Q-6 of counter 44 to NOR gate 43 and is again set by the following bit-rate clock pulse from control circuit 23 to NOR gate 42.

Counter 44 is reset each time a framing word begins and is advanced by a count of 1 as each seven bit word is completed. To this end, the reset (R) terminal of counter 44 is connected to the output of NOR gate 42 of flip-flop 33. The clock (CL) input terminal of register 44 is connected to the output of the first Q-0 output of counter 45 included in Barker word generator 22. A binary one signal is derived from the Q-0 output of counter 45 at the beginning of each seven bit word transmitted. To this end, counter 45 includes a clock (CL) input terminal directly responsive to the square wave clock waveform derived from clock source 38 and a reset (R) input terminal responsive to the output of exclusive OR gate 34. Exclusive OR gate 34 includes a pair of inputs respectively responsive to the output of NOR gate 42 of flip-flop 33 and the last stage (stage 7) output of counter 45. Thereby, counter 45 is continuously advanced in steps from zero to six in response to the clock waveform of source 38, and is then reset to zero thus enabling the generation of seven bit words. It is also reset in response to flip-flop 33 being reset at the end of a frame in response to the Q6 output of counter 44.

One out of sixteen lead to four serial bit converter 21 includes a one out of sixteen lead to four parallel bit converter 51 having sixteen inputs respectively responsive to buttons 1, 2, 3 . . . 15 and C of keyboard 17. Converter 51 responds to the single energized line coupled to it by keyboard 17 to derive a four bit parallel binary signal on output terminals 52-55. The signals on terminals 52–55 are respectively applied to NAND gates 56–59; NAND gates 56–59 are also respectively responsive to the signals sequentially derived from outputs 2–5 of counter 44. Output terminals of NAND gates 56–59 are applied to NOR gate 60 which derives a four bit serial binary signal having values that are sequentially equal to the value simultaneously derived on terminals 52–55. Each of the four bits sequentially derived from NOR gate 60 has a period equal to the duration of one seven bit Barker word. The four binary bits derived from NOR gate 60 are supplied to exclusive OR gate 62 of Barker word generator 22.

Barker word generator 22 indicates the presence of a binary one address data bit as seven sequential binary bits respectively having values of 1110010. To this end, the outputs 0, 1, 2 and 5 of counter 45 are supplied to NOR gate 63, having an output that is coupled to an input of exclusive OR gate 62. The combination of exclusive OR gates 62 and 65 responds to the output signals of NOR gates 60 and 63 to derive a sequence of 1110010 in response to a binary one level derived from NOR gate 60 over the duration of one Barker data word. In response to a binary zero being derived by NOR gate 60, exclusive OR gates 62 and 65 respond to the sequential output bits or NOR gate 73 to derive the sequence 0001101 at the output of gate 65. The output of exclusive OR gate 63 is coupled to one input of OR gate 64 via exclusive OR gate 65, which effectively functions as an inverter for the output of exclusive OR gate 62 because the two inputs of exclusive OR gate 65 are respectively connected to the output of exclusive OR gate 62 and to a positive d.c. bias voltage at terminal 66. OR gate 64, in addition to being responsive to the Barker word derived from exclusive OR gate 62, is responsive to the first stage (stage 0) output of counter 44. The connection between stage 0 of counter 44 and the input of OR gate 64 assures that a sequence of seven binary ones is derived during the first seven bit word, for framing purposes. The Barker word, in the same format as derived from counter 45 during the second word of the six word sequence, is invariably coupled by OR gate 64 to transmitter 24 because no path exists from the second stage counter 44 to NOR gate 60. If it is desired to complement the Barker word at will, transmitter 16 can be provided with a switch (not shown) to selectively change the d.c. bias voltage applied to exclusive OR gate 65 so the plus bias voltage at terminal 66 can be changed at will to a ground or negative d.c. bias.

Reference is now made to FIG. 3 of the drawings, a block diagram of the circuitry included at one of transceivers 1–15. The suppressed carrier offset quadrature phase shift key signal derived from transmitter 16 is received at the transceiver and demodulated by suppressed carrier offset quadrature phase shift key receiver 71, which derives a non-return-to-zero sequence of binary data bits that, in the absence of interference, is either a replica of the binary data bit sequence transmitted from the transmitter or represents the complement of this sequence.

The binary data bits derived by receiver 71 are serially loaded into a seven stage shift register 72 under the control of square wave clock pulses derived by clock source 73 and applied to clock (CL) input terminal of the seven bit shift register. Clock pulses derived from source 73 have a repetition rate equal to the bit rate of pulses derived from clock source 38, at the transmitter. Clock source 73 is synchronized to the received NRZ data by utilizing phase locked loop techniques, as known in the prior art. The seven bit parallel output of register 72 is applied to Barker decoder circuit 75 that responds to the second word of each six word sequence received at the transceiver; decoder 75 also responds to the following four data words to supply signals to output leads 76 and 77. The presence of a binary one signal on lead 77 indicates that a Barker word has been completely received and decoded by decoder 75 while the polarity of the output on lead 76 indicates whether it is a data one or zero.

The signal on lead 77 is supplied to a reset (R) terminal of eight bit counter 78, having a clock (CL) input driven in parallel with the CL input of register 72 by the bit rate clock pulses derived from clock source 73. The last stage of counter 78 supplies an output to reset input terminals of five bit data shift register 79 and divide-by-five counter 80; counter 80 has a clock input responsive to the signal on lead 77. When five Barker words have been received and decoded, shift register 79 is loaded so that the most significant bit stage thereof has a binary one or zero value to indicate the polarity of the received Barker words, and the remaining four stages indicate the binary value of the received data indicating Barker words; if, for example, the Barker polarity indicating word has a binary one value and the addressed transmitter has a binary code of 0101, a digital value of five, the most significant bit stage of register 79 stores a binary one value, while the remaining four stages of register 79 alternately store binary zero and one values. The binary values stored in register 79, at the completion of the six seven bit words, are read out from the register into Sel Call/Con Call decoding circuit 81, in response to circuit 81 being enabled by the trailing edge of an output pulse of counter 80 which is derived when five Barker words have been detected as being present.

Decoding circuit 81 responds to the polarity indicating bit and data bits supplied to it by register 79 and a four bit select call address for the particular receiver, as derived from source 83 to activate indicating lamp 84. Decoder 81 responds to the polarity bit output of shift register 79 to selectively invert the four data bits, depending upon the value of the polarity indicating bit. Lamp 84 is activated in response to the four polarity corrected data bits being the same as the four bit binary word in address source 83. If an indicator lamp 84 is activated, the operator of the called transceiver is apprised of the fact that he is being called from transmitter 16.

If transmitter 16 is signalling for a conference call, whereby all four data bits read out of shift register 79 into decoding circuit 81 have polarity corrected binary one values, the decoding circuit responds to the binary one bits to activate indicator lamp 85. The presence of four internal binary ones within decoder 81 is recognized to energize indicator 85.

In operation, after the bits of clock source 73 have been synchronized to the NRZ bits derived from receiver 71, the seven zero (or seven one) bits of the framing word are supplied in sequence to register 72. The seven framing bits are shifted through register 72 and simultaneously read out of the register into decoder 75. Decoder 75 responds to the non-Barker word by deriving a binary zero signal on output lead 77. The binary zero signal on lead 77 has no effect on the reset input of counter 78. In consequence, counter 78 is advanced to its last stage in response to eight successive clock pulses from source 73 and a binary one signal is derived from the last stage. This signal is applied in parallel to reset (R) input terminals of shift register 79 and Barker word counter 80, to return shift register 79 and counter 80 to the initial states thereof. Hence, the framing word causes the entire system to be reset to zero. Similarly, any seven bit combination of binary bits that is supplied by register 72 to decoder 75 which is not recognized by the decoder as a Barker word allows the decoder illustrated in FIG. 3 to be reset. As described infra, decoder 75, however, has the capability of recognizing a seven bit output of register 72 as a Barker word, even if there is a one bit error in the seven bit Barker word. Such a feature enables the system to provide address detection with very low power and signal to noise ratio links.

In response to the second word (polarity indicating Barker word) of the six word sequence being read from shift register 72 and an enable signal from shift register 74, Barker decoder 75 is activated to derive a binary one or zero on lead 76. A binary one on lead 76 indicates that the Barker word has a logic one value, indicated by the sequence 1110010, while a binary zero output on lead 76 indicates that the Barker word has a logic zero value, indicated by the sequence 0001101. The binary zero or one output on lead 76 is applied to a data input terminal of shift register 79 to be loaded into the first stage of the shift register. After a short delay, a binary one signal derived on lead 77 by decoder 75 is supplied in parallel to clock inputs of 79 and 80. In response to the binary one signal on lead 77 being applied to the reset input of counter 78, the counter is returned to its initial condition, so that resetting register 79 and counter 80 cannot occur. The binary one signal on lead 77 clocks the binary one or zero on lead 76 to the least significant bit stage of shift register 79. The following four Barker words step the binary signal initially loaded into the least significant bit stage of register 79 to the last, most significant bit stage of the register.

To reduce to a very low minimum the probability of recognizing a random reception of binary bits as a CALL message, Barker decoder 75 is inhibited for six bits after the recognition of a Barker word. Inhibiting decoder 75 insures that five Barker words cannot be recognized from a reception of a shorter than normal length message. To this end, D, reset (R) and clear (CL) inputs of flip-flop 74 are respectively supplied with a positive bias, an output of eight bit counter 78 and an output of Barker decoder 75 so the flip-flop Q output inhibits Barker decoder 75 at all but the proper times.

If counter 78 counts seven bits without Barker recognition, it supplies a reset pulse from its penultimate stage (P) to flip-flop 74. Thereby, flip-flop 74 derives a binary zero output that is supplied to decoders 91 and 92 of decoder 75, enabling recognition of a Barker word. In response to Barker word recognition, the output of decoder 75 on line 77 is coupled via inverter 178 as a clock input to flip-flop 74; the resulting binary one output of flip-flop 74 inhibits decoders 91 and 92. The Barker recognition also resets counter 78. After seven additional bits from clock 73, the output pulse from the penultimate stage of counter 78 again resets flip-flop 74, to enable counters 91 and 92. For a normal message this process continues. In the case of a false message producing an accidental Barker word, the probable lack of recognition seven bits later of a second Barker word allows counter 78 to proceed and produce an output from the last counter stage. The output of the last stage of counter 78 clears data shift register 79, resets data counter 80, and again places the Barker decoder in a receptive state for a true message.

It is obvious that this approach also provides protection against the very improbable reception of up to four successive accidental Barker words while exhibiting a rapid recovery for reception of a true message.

In particular, if the next seven bit word supplied to register 72 is a Barker word representing the first data address bit, Barker decoder 75 derives a binary one or zero on lead 76 and a binary one on lead 77. The binary signals on leads 76 and 77 cause the contents of shift register 79 to be advanced and the value of the first data address bit on lead 76 to be stored in the least significant stage of the register; the binary one level on lead 77 causes the polarity indicating binary value previously loaded in the least significant bit stage of shift register 79 to be shifted to the second least significant bit stage thereof. The binary one signal on lead 77 is also supplied to the clock input of counter 80, to advance the counter to a count of two.

The operation of register 72, decoder 75, registers 78 and 79, as well as counter 80, continues in this manner for the remaining three address indicating Barker words. When the final Barker word has been received, the most significant bit position of shift register 79 stores a binary one or zero, to indicate the value of the polarity indicating Barker word. The remaining four stages of register 79 store binary ones and zeros commensurate with the four data Barker words. In response to the delayed value of the fifth binary one signal derived on lead 77, counter 80 is advanced so that it stores a count of five. In response to counter 80 having a count of five, a signal is supplied by the counter to the enable input of decoder 81, whereby the decoder responds to the five bits stored in shift register 79. As described supra, decoder 81 responds to the five bits stored in register 79 and the four bits in select call address source 83 or an internal source of four binary one bits to activate one of indicators 84 or 85.

Generally, repeated sequences of six words, each having seven bits, are transmitted from transmitter 16 prior to a voice data link being established between the transmitter and selected one of transceivers 1-15, or all of the transceivers. If an incomplete message or one containing too many errors is not recognized, the non-Barker word forming the next framing sequence activates reset circuit 78, as described supra; activation of reset circuit 78 resets register 79 and counter 80 so that the transceiver is ready to be responsive to the polarity indicating Barker word and the following four data indicating Barker words. The transmitted message is generally repeated a sufficient number of times to provide the desired statistical probability of recognition.

A preferred embodiment of Barker decoder 75 is illustrated in FIG. 4. As indicated supra, Barker decoder 75 derives a binary one or zero level on output lead 76 in response to the bits of a Barker word representing a one or zero value being supplied to decoder 75. Decoder 75 also supplies a binary one or zero value to lead 76 in response to a seven bit word supplied to the decoder by register 72 differing from a Barker word sequence (1110010 or 0001101) by one bit, i.e. if there is a one bit error in the received Barker word. In response to a Barker word sequence or a Barker word sequence having a one bit error being detected by decoder 75, a binary one level is derived on output lead 77. To these ends, decoder 75 includes four line to sixteen line decoder 91, binary coded decimal to decimal decoder 92 and a logic circuit 93 including numerous OR, NOR and AND gates, as well as an inverter.

Decoder 91 is connected to be responsive to the four least significant bits derived from shift register 72, while binary coded decimal to decimal decoder 92 is responsive to the three most significant bits derived from the shift register. Decoder 92 derives a binary one output on an appropriate terminal in response to the three most significant bits representing a binary one or zero valued Barker word or if one of the three most significant bits differ from a binary zero valued Barker word by one bit. Decoder 91 derives a binary one output on an appropriate terminal in response to the four least significant bits representing a binary one or zero valued Barker word or if one of the four least significant bits differ from a binary one or zero valued Barker word by one bit. Hence, if a true or binary one valued Barker word (1110010) is read out of shift register 72, the three inputs of decoder 92 are supplied with the binary bits 111, while the four inputs of decoder 91 are supplied with the binary bits 0010. Decoder 91 responds to the four parallel binary inputs thereof to activate one of the sixteen outputs thereof so that one of the sixteen outputs thereof is energized in accordance with the binary value of the four bits supplied to it. Decoder 91 is arranged so that only 10 of the sixteen outputs thereof are connected to logic circuit 93. In particular, outputs are coupled from terminals S0, S2, S3, S5, S6, S9, S10, S12, S13, and S15 to circuit 93 in response to the four parallel binary bits supplied to register 91 having values commensurate with 0 (0000), 2 (0010), 3 (0011), 5 (0101), 6 (0110), 9 (1001), 10 (1010), 12 (1100), 13 (1101), and 15 (1111). Binary coded decimal to decimal decoder 92 is arranged so that connections are made to circuit 93 from the output terminals thereof associated with the binary coded decimal values of 0, 1, 2, 4 and 7. The aforementioned connections to the outputs of decoders 91 and 92 enable one and zero Barker words to be detected as binary zeros and ones, as well as to enable Barker words that differ from being a one and zero by one bit to be detected as one and zero valued Barker words.

To detect the one and zero valued Barker words and to provide indications of one and zero values of the Barker words if there is a one bit error in the Barker word, logic network 93 includes an arrangement of gates as follows: NOR gate 101 is connected to the output terminals of decoder 92 associated with binary coded decimal values of 0, 1, 2 and 4; OR gate 102 is connected to terminals S0, S3, S6 and S10 of decoder 91; OR gate 103 is connected to output terminals S5, S9, S12 and S15 of decoder 91; S2 output terminal of decoder 91 is connected to one input of AND gate 104, having a second input directly responsive to the output of NOR gate 101; the S13 output terminal of decoder 91 is connected to one input of AND gate 105, having a second input responsive to the output of NOR gate 101, as inverted by inverter 106; the zero indicating output of decoder 92 is combined with the output of NOR gate 103 in AND gate 107; the seven indicating output of decoder 92 is combined in AND gate 108 with the output of NOR gate 102; the outputs of AND gates 104 and 108 are combined in NOR gate 109, AND gates 107 and 105 and gate 110; the outputs of NOR gates 109 and 110 are combined in NOR gate 111. The output signals of NOR gates 110 and 111 are respectively applied to leads 76 and 77, whereby a binary one level on lead 77 indicates that a one or zero valued Barker word has been detected or that a seven bit word differing by one bit from a one or zero valued Barker word has been detected. The binary value on lead 76 which occurs simultaneously with the occurrence of a binary one on output lead 77 indicates whether the detected Barker word has a one or zero value.

Reference is now made to FIG. 5 of the drawing wherein there is illustrated a circuit diagram of decoder 81. Decoder 81 responds to four address bits derived in parallel from select call address source 83; the four bits indicate the address of the particular transceiver where the call decoder of FIG. 3 is located. In addition, decoder 81 is responsive to the five binary bits derived from shift register 79 at the completion of the fifth Barker word of a six word address command sequence. Decoder 81 responds to the five bits derived from register 79 in response to an enable signal derived by five bit data counter 80. In addition, decoder 81 includes internal circuitry to indicate if a conference call has been established as a result of a transmission of four binary data Barker words having binary one values.

To determine if a conference call has been established decoder 81 includes four exclusive OR gates 121–124, respectively responsive to the four least significant bit outputs of register 79; i.e., to the binary one or zero values associated with the four data representing Barker words. In addition, each of gates 121–124 responds to the polarity bit in the most significant bit stages of register 79. In response to the inputs to gates 121–124 from the four most significant bit stages of register 79 all having the same values as the polarity indicating bit, each of exclusive OR gates 121–124 derives a binary zero output level. The binary zero levels are supplied to NOR gate 125 to produce a binary one output which is combined in NAND gate 126 with the binary one enable signal derived from the count five terminal of counter 80 after the recognition of five successive Barker words. The resulting binary zero output of NAND gate 126 is reversed in polarity by inverter 127 that drives indicator 85 to provide a signal that a conference call is being established. If any of the inputs to exclusive OR gates 121–124 from the four least significant bit stages of register 79 do not coincide with the polarity indicating bit derived from the most significant bit stage of the register, at least one of exclusive OR gates 121–124 derives a binary one output and a binary zero is derived from NOR gate 125. The binary zero output of NOR gate 125 prevents activation of indicator 85.

In parallel with control of indicator 85, a test is made to determine if the four polarity corrected least significant bits derived from register 79 coincide with the four bits in address source 83. To these ends, exclusive OR gates 131–134 are provided. One input of each of gates 131–134 responds to the outputs of exclusive OR gates 121–124, respectively. The other inputs to exclusive OR gates 131–134 respond to the binary voltage values on the four address indicating lines derived from source 83. Exclusive OR gates 121–124 respond to the polarity indicating bit derived from register 79 to selectively invert the polarity of the four data bits derived from register 79. The selected inversion of the outputs of these exclusive OR gates to be made with the four bits of address source 83, regardless of the reference polarity of the received Barker words, i.e. regardless of whether a sequence of 1110010 represents a binary one or zero.

In response to the four bits derived from exclusive OR gates 121–124 being the same as the values of the four bits in address source 83, all of exclusive OR gates 131–134 derive a binary one output. The binary one outputs of exclusive OR gates 131-134 are combined in AND gate 135, having an output which is combined in NAND gate 136 with the enable output of counter 80. In response to binary one levels being simultaneously supplied to both inputs of NAND gate 136, the NAND gate derives a binary zero level which is changed to a binary one level by inverter 137 and applied to indicator 84. Hence, indicator 84 is activated only if the four transmitted Barker words coincide with the address of source 83. If any other combination of Barker words is derived from transmitter 16, indicator 84 remains inactive.

Not described herein is circuitry which may be used to permit manual resetting and/or latch indicators for predetermined time periods before automatic resetting.

While there has been described and illustrated one specific embodiment of the invention, it will be clear that variations in the details of the embodiment specifically illustrated and described may be made without departing from the true spirit and scope of the invention as defined in the appended claims.

One important variation for which the message structure is ideally suited involves the use of modern word detection methods which recognize the Barker word essentially as a unit rather than as an assmblage of seven binary decisions. In very poor signal to noise environments, the word error rate is significantly decreased by the former approach.

An optimum simple and decreasingly costly approach involves the use of a seven bit correlator matched to the Barker sequence. This device recognizes both Barker and Barker complement words whenever they appear with respectively opposite polarity outputs, requires no clocking or bit synchronization, and provides information on word detection reliability from the relative output level.

A similar near-optimum approach termed the "soft decision" method uses multilevel rather than binary decisions on each of the seven binary bits in a Barker word. The recognized level is associated with a decision reliability factor for each bit, and an established algorithm (not part of the present invention) may be used to more accurately determine the presence and polarity of a Barker word. The quantized levels can be translated into binary words and the algorithm performed effectively by simple digital computation.

We claim:

1. A method of transmitting multi-bit binary serial data signals comprising generating a sequence of binary data bits, responding to each of said binary data bits having a first value to derive a first multi-bit binary Barker word having a first predetermined combination of serial binary bits, responding to each of said binary data bits having a second value to derive a second multi-bit binary Barker word having a second predetermined combination of serial binary bits, the first and second combinations including the same number of bits, the bits in like positions of the first and second combinations having complementary binary values, and transmitting the Barker words in serial form.

2. A method of selectively calling one of a plurality of different stations identified by different numerical values comprising converting the numerical value of a station being called into a multi-bit serial data word having data bits representing the numerical value, responding to each binary data bit having a first value to derive a first multi-bit binary Barker word having a first predetermined combination of serial binary bits, responding to each binary data bit having a second value to derive a second multi-bit binary Barker word having a second predetermined combination of serial binary bits, the first and second combinations including the same number of bits, the bits in like positions of the first and second combinations having complementary binary values, transmitting the Barker words to the different stations, receiving the transmitted Barker words at the different stations, and recognizing the transmitted Barker words at the station being called.

3. The method of claim 2 wherein the station being called recognizes Barker words received thereby as true Barker words even if there is a one bit error in a word received thereby.

4. The method of claim 2 or 3 comprising resetting the recognition operation at a particular station in response to any word received at the particular station not being recognized as a true Barker word.

5. A method of selectively calling by a binary serial data stream one of a plurality of different stations identified by different numerical values comprising deriving a multi-bit framing word having a first predetermined combination of binary bits, deriving a multi-bit polarity identifying first Barker word, converting the numerical value of the station being called into a multi-bit data word having data bits representing the numerical value, responding to each binary data bit having a first value to derive a second multi-bit binary Barker word having a second predetermined combination of binary bits, responding to each binary data bit having a second value to derive a third multi-bit binary Barker word having a third predetermined combination of binary bits, the first, second and third combinations including the same number of bits, the bits in like positions of the second and third combinations having complementary values, the bits of the polarity identifying Barker word having the same values as the bits of one of the second or third combinations, and sequentially transmitting the framing word, then the polarity identifying word, then the called station representing Barker words to the different stations, receiving the transmitted words at each of the different stations, responding to the received framing word and the received polarity identifying Barker word at each station to set a recognition code for the data representing Barker words, responding to the received data representing Barker words and the recognition code to decode the Barker data words received at the called stations, and resetting the decoding operation in response to the framing word being received at the stations.

6. The method of claim 5 wherein the first combination differs from the second and third combinations in at least two bit positions, recognizing the received data Barker words as true Barker words even if there is a one bit error in the received data word, and resetting the decoding operation in response to a received multi-bit word being different from a transmitted Barker word in at least two bit positions.

7. The method of claim 5 wherein all of the stations can be simultaneously called, assigning a predetermined unique multi-bit binary data word to indicate that all of the stations are to be simultaneously called, responding to each bit of the unique data word in the same manner as the data bits representing the numerical value, responding to the decoded Barker words to indicate that a particular called station was called in response to both the multi-bit data representing the numerical value for the particular station and the unique data word.

8. A receiver for binary serial data in a system wherein different receiving stations are identified by different numerical values, said stations being called with a multi-bit framing word having a first combination of binary bits, a multi-bit polarity identifying first Barker word and a multi-bit data word having data bits representing the numerical value of the station being called, each binary data bit having a first value being indicated by a second multi-bit binary Barker word having a second predetermined combination of binary bits, each binary data bit having a second value being indicated by a third multi-bit binary Barker word having a third predetermined combination of binary bits, the first, second and third combinations including the same number of bits, the bits in like positions of the second and third combinations having complementary binary values, the first combination being different from the second and third combinations, the bits of the polarity identifying Barker words having the same values as the bits of one of the second or third combinations, wherein the framing word, then the polarity identifying word, then the called station representing Barker words are sequentially transmitted to the different stations, the receiver comprising: means for receiving the transmitted words, means responsive to the received framing word and the received polarity identifying Barker word at each station for setting a recognition code for the data representing Barker words, means responsive to the received data representing Barker words and the recognition code for decoding the Barker data words received at the called stations, and means for resetting the decoding means in response to the framing word being received at the receiver.

9. The receiver of claim 8, wherein the first combination differs from the second and third combinations in at least two bit positions, means for recognizing the received data Barker words as true Barker words even if there is a one bit error in the received data word, said means for resetting the decoding means being activated in response to a received multi-bit word being different from a transmitted Barker word in at least two bit positions.

10. In an apparatus for transmitting multibit serial binary data signals, a source of binary data bits, means responsive to each of said binary data bits having first and second values for respectively deriving first and second multi-bit binary Barker words having first and second combinations including the same number of bits, the bits in like positions of the first and second combinations having complementary binary values.

11. In an apparatus for selectively calling by serial binary transmission one of a plurality of different stations identified by different numerical values, a source of signals identifying the numerical values of the different stations, means responsive to the signal source for converting the numerical value of the station being called into a multi-bit data word having data bits representing the numerical value, means responsive to binary data bits having first and second values for respectively deriving first and second serial multi-bit binary Barker words having first and second predetermined combinations of binary bits, the first and second combinations including the same number of bits, the bits in like positions of the first and second combinations having complementary binary values.

12. A receiver for receiving serial binary data in a system wherein different stations are identified by different numerical values, each of said stations capable of being called with a multibit data word having data bits representing a respective numerical value, each binary data bit having a first value represented by a first multibit binary Barker word having a first predetermined combination of binary bits, each binary data bit having a second value represented by a second multi-bit binary Barker word having a second predetermined combination of binary bits, the first and second combinations including the same number of bits, the bits in like positions of the first and second combinations having complementary binary values, the receiver comprising: means for receiving the Barker words, means for converting the received Barker words having the first and second combinations into binary bits respectively having first and second values, and means responsive to the converted binary bits having values associated with the called station for signalling that the station was called.

13. The receiver of claim 12 wherein all of the different stations can be called with the same multi-bit conference data word, said signalling means including means for indicating that the station was called in response to both the multi-bit conference data word and the data word associated with the particular called station.

14. The receiver of claim 12 or 13 wherein the converting means includes means for recognizing the received Barker words as true Barker words even if there is a one bit error in the received word.

15. A method of selectively calling one of a plurality of different station identified by different numerical values by transmitting a serial binary data stream comprising deriving a multi-bit framing word having a first combination of binary bits, converting the numerical value of the station being called into a multi-bit data word having data bits representing the numerical value, responding to each binary data bit having a first value to derive a first multi-bit binary Barker word having a second predetermined combination of binary bits, responding to each binary data bit having a second value to derive a second multi-bit binary Barker word having a third predetermined combination of binary bits, the first, second and third combinations including the same number of bits, the bits in like positions of the second and third combinations having complementary binary values, the first combination being different from the second and third combinations, and sequentially transmitting (1) the framing word, and (2) the station being called representing Barker words to the different stations, receiving the transmitted words at each of the different stations, responding to the received framing word to initiate a recognition sequence for the data representing Barker words, after the recognition sequence has been initiated, responding to the received data representing Barker words to decode the Barker data words received at the called station, and resetting the decoding operations in response to the framing word being received at the stations regardless of the state of the recognition sequence.

16. The method of claim 15 wherein the first combination differs from the second and third combinations in at least two bit positions, recognizing the received data Barker words as true Barker words even if there is a one bit error in the received data word, and resetting the decoding operation in response to a received multi-bit word being different from a transmitted Barker word in at least two bit positions.

17. The method of claim 15 wherein the first combination differs from the second and third combinations in at least two bit positions, and resetting the decoding operation in response to a received multi-bit word being different from a transmitted Barker word in at least two bit positions.

18. A receiver for serially transmitted binary coded data bits, each binary data bit having a first value represented by a first multi-bit binary Barker word having a first predetermined combination of serial binary bits, each binary data bit having a second value represented by a second multi-bit binary Barker word having a second predetermined combination of serial binary bits, the first and second combinations including the same number of bits, the bits in like positions of the first and second combinations having complementary binary values, the receiver comprising: means for receiving the Barker words, means for converting the received Barker words having the first and second combinations into binary bits respectively having first and second values.

19. The receiver of claim 18 wherein the converting means includes means for recognizing received Barker words as true Barker words even if there is a one bit error in the received word.

20. The receiver of claim 18 or 19 comprising means for resetting the converting means in response to any word received at the receiver not being recognized as a true Barker word.

21. A method of communicating binary data bits between a transmitter and receiver comprising at the transmitter: responding to each binary data bit having a first value to derive a first multi-bit binary Barker word having a first predetermined combination of serial binary bits, responding to each binary data bit having a second value to derive a second multi-bit binary Barker word having a second predetermined combination of serial binary bits, the first and second combinations including the same number of bits, the bits in like positions of the first and second combinations having complementary binary values, transmitting the Barker words to the receiver; at the receiver: receiving the transmitted Barker words, in response to a Barker word having the first combination of serial binary bits deriving one of the binary data bit values, in response to a Barker word having the second combination of serial binary bits deriving the other binary bit value.

22. The method of claim 21 wherein the receiver recognizes Barker words received thereby as true Barker words even if there is a one bit error in the Barker word received thereby.

23. The method of claim 21 or 22 comprising resetting the receiver binary data bit derivation operation at the receiver in response to any word received at the receiver not being recognized as a true Barker word.

24. A binary signal communication system comprising a transmitter including: a source of binary data bits, means responsive to each of said binary data bits having first and second values for respectively deriving first and second multi-bit combinations of serial binary bits, each of said first combination of serial binary bits being a first multi-bit binary Barker word, each combination of the second serial binary bits being a second multi-bit binary Barker word, the first and second combinations including the same number of bits, the bits in like positions of the first and second combinations having complementary values, means responsive to said last named means for transmitting the combinations of serial binary bits; a receiver including: means for receiving the transmitted combinations of serial binary bits, and means responsive to the received combinations of serial binary bits for deriving binary bits having two different values in response to the received combinations of bits having the first and second combinations of the binary bits.

25. The system of claim 24 wherein deriving means can respond to a one bit deviation in the combination of serial bits from the first and second combinations of the serial bits to still derive the binary bits having the different values.

26. The system of claim 24 or 25 further including means for resetting the means for deriving binary bits having two different values in response to the received combination of bits deviating by more than one bit from the first and second bit combinations.

* * * * *